Patented Jan. 7, 1936

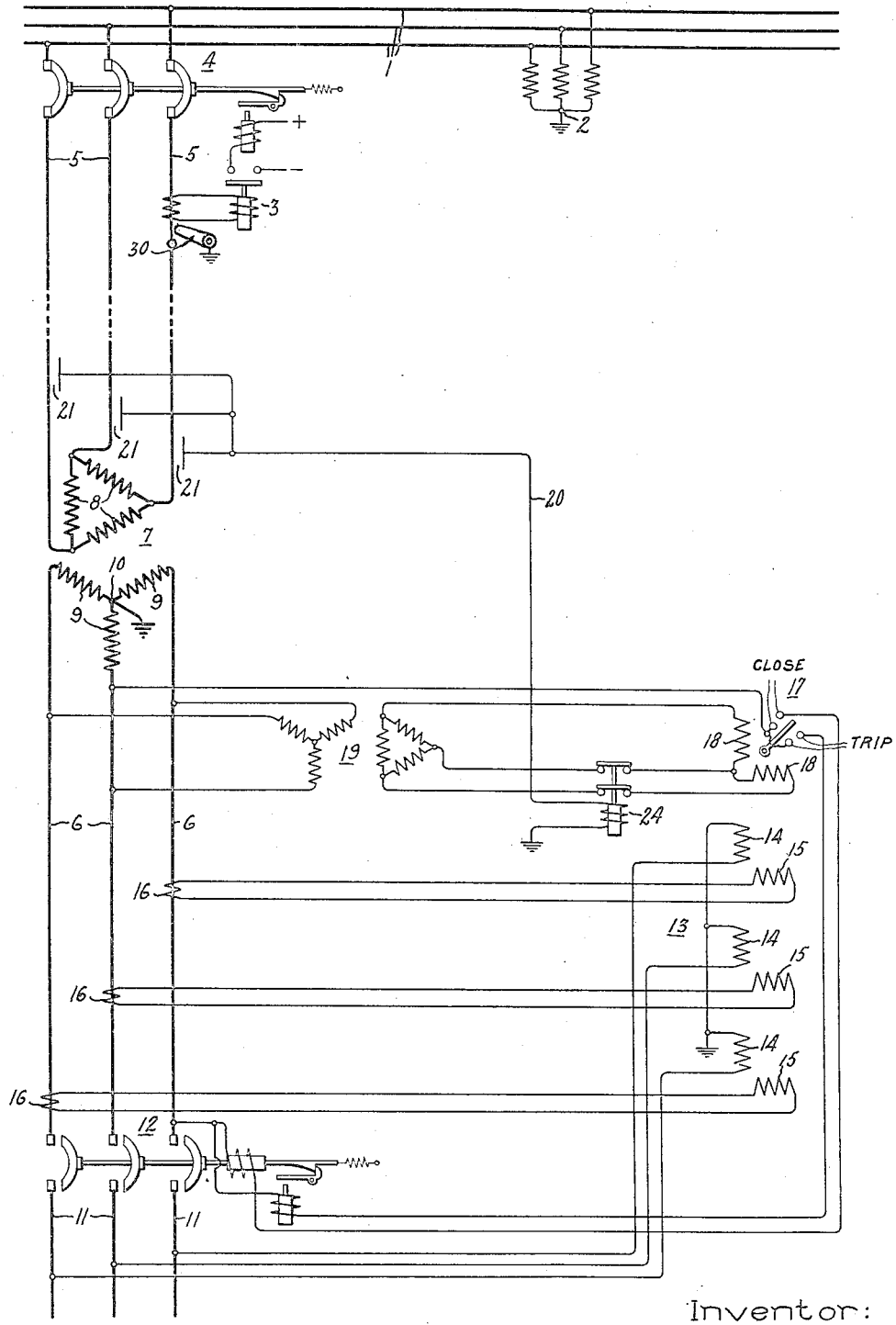

2,027,204

UNITED STATES PATENT OFFICE 2,027,204

CONTROL AND PROTECTION OF ELECTRIC CIRCUITS

Hudson R. Searing, New York, N. Y., assignor to General Electric Company, a corporation of New York Application June 23, 1934, Serial No. 732,049
Renewed November 12, 1935

7 Claims. (Cl. 175—294)

My invention relates to improvements in the control and protection of electric circuits and more particularly to improvements in the control and protection of alternating current network distribution systems and an object of my invention is to provide a control and protective arrangement which is in general an improvement on arrangements heretofore known to the art.

In network distribution systems, one or more feeders are connected to the network through step-down transformers and network protectors. Energy directional responsive devices are usually associated with the protectors so as to disconnect the network from the feeder when for any reason, such as a fault on the feeder, power flow is from the network to the feeder. In order to isolate feeders for inspection and maintenance and incidentally to save losses, these energy directional responsive devices have been given a sensitivity of response such as to disconnect the network from the feeder merely on the reverse flow of power due to the magnetizing current of the transformer in a feeder out of service, that is, disconnected at the power station. This degree of sensitivity frequently results in unnecessary interruptions due to feed back from regenerating elevator motors or to circulating currents arising from slight differences in feeder voltages.

In order to avoid such undesired operations, the energy directional means was desensitized or restrained in some manner usually in dependence on the network voltage. But this sacrificed the desired feeder isolation control and also the tripping on reverse magnetizing current.

While these features are desirable, potential deivces for obtaining them must not increase the hazard of the system or reduce its economies of operation. Also where it is customary to apply a high voltage D. C. test to the feeders and connected equipment, any means provided to give the desired control and sensitivity should be able to withstand such high voltage tests without damage or change in characteristic and also in the event of systems with a large number of transformers connected to one feeder not overload the testing means employed. Further it is desirable to be able automatically to disconnect the network from the feeder by a simple operation performed at the station.

An object of my invention is to provide an improved control and protective arrangement for providing non-sensitive protection under normal operating conditions and yet obtaining a more sensitive operation whenever a ground occurs on the feeder whether the ground is accidental as a fault or purposely applied in order to disconnect the feeder from the network.

Another object of my invention is to provide such an improved arrangement as will not be affected by and will not interfere with the high voltage direct current tests which are applied to network systems of the type in question. These and other objects of my invention will appear in more detail hereinafter.

My invention will be better understood from the following description when considered in connection with the accompanying drawing and its scope will be pointed out in the appended claims.

In the single figure of the accompanying drawing, I have shown for the purpose of illustrating my invention an embodiment thereof as applied to the control and protection of an electric system comprising two electric circuits 5 and 6. As illustrated, these are three-phase circuits which are inductively coupled by a transformer 7 having windings 8 delta-connected to the circuit 5 and windings 9 Y-connected to the circuit 6 with the neutral point 10 grounded. The circuit 5 may represent one of a plurality of feeder circuits which are arranged to supply the network indicated schematically by the conductors 11. The network is connected to the respective feeders through suitable circuit interrupting means such as a latched closed circuit breaker 12. The feeders 5 extend from one or more power stations 1, which are usually provided with a grounded neutral 2. Each feeder is provided with fault responsive protective means, such, for example, as overcurrent relays 3, only one being shown for simplicity, and suitable circuit interrupting means 4 for opening the feeder at the power station on the occurrence of abnormal conditions on the feeder. At the power station the feeder may be provided with means such as a switch 30 for grounding one or more of the feeder conductors after the station feeder circuit breaker has opened, as disclosed for example in British Patent 396,853. Likewise as disclosed in United States Letters Patent 1,883,839, issued October 18, 1932, there may be provided energy directional responsive means such as a polyphase power directional relay 13 which is responsive to the exchange of energy between the network and the feeder to effect the opening of the circuit breaker 12 when energy flow is from the network to the feeder. This relay comprises voltage windings 14 which are connected to be energized from the network side of the circuit breaker 12 and cooperating current windings 15 which are connected to be energized from current transformers 16 on the feeder side of the circuit breaker 12. Also, as disclosed in the said United States Letters Patent, the relay 13 may be provided with a restraining or desensitizing means 17 which is simply illustrated as two voltage windings 17. These are connected to be energized by the potential transformer 19 and to exert a restraining torque tending to prevent movement of the relay to the tripping position.

In accordance with my invention, I provide means responsive to an unbalance of the impedances to ground of the phase conductors of the circuit 5 which may occur, for example, in case of a ground on the circuit 5, whether the ground is accidental, as a ground fault, or is purposely applied through the switch 30 at the power station after disconnection of the circuit therefrom, for increasing the sensitivity of response of the relay 13 whereby to insure the disconnection of the network 11 from the feeder 5 by the opening of the circuit breaker 12. As shown, this means comprises a circuit or path 20 between the conductors of the feeder 5 and ground so connected as to be energized in accordance with the zero phase sequence voltage of the feeder on the occurrence of a ground on the feeder. Thus circuit 20 may be coupled to the feeder 5 by resistance or reactance coupling. I have chosen to illustrate the latter schematically by condensers 21 which may be formed in case of cable conductors by an intermediate shield on the cable insulation, although inductive reactance coupling may be used as desired. The circuit 20 includes means such as an auxiliary relay 24 for controlling the restraint of the restraining means 17 when the circuit is energized sufficiently to cause operation of the relay 24 whereby to sensitize the directional responsive relay 13.

Whenever a phase conductor of the circuit 5 is grounded the circuit 20 is energized because the capacitances to ground of the phase conductors of the circuit 5 are no longer balanced. Sufficient current is thereby enabled to flow in the circuit of the auxiliary relay 24 to cause it to open its contacts in the circuits of the voltage windings 18 of the restraining means 17, whereby to remove the restraint. The amount of this current is of course increased when the circuit breaker 4 opens because the voltages to ground of the ungrounded conductors go from Y voltage to delta voltage.

Assuming, for example, a ground fault on the circuit 5, the protective means 3 and 4 at the power station 1 operate to disconnect the feeder at the station. The voltage to ground on the ungrounded conductors of the feeder 5 rises from Y voltage to delta voltage because the feeder is still energized from the network. The circuit of the auxiliary relay 24 is energized as previously pointed out, and this relay operates to remove the restraint from the relay 13. By reason of the increased sensitivity the directional relay 13 operates to effect the tripping of the circuit breaker 12, in response to the flow of transformer magnetizing current from the network to the feeder.

If it is desired to isolate a feeder from the network at any time, the circuit of the feeder may be opened at the power station and then one of the feeder conductors grounded by the switch 30. As soon as this is done, the circuit 20 is energized and the voltage to ground of the ungrounded conductors rises from Y voltage to delta voltage. The auxiliary relay 24 is accordingly energized and operates to sensitize the direction of relay 13 as to insure the tripping of the circuit breaker 12 on the flow of transformer magnetizing current from the network to the feeder.

While I have shown and described my invention in considerable detail, I do not desire to be limited to the exact arrangements shown but seek to cover by the appended claims all those modifications which fall within the true spirit and scope of my invention.

What I claim as new and desire to secure by Letters Patent of the United States is:

1. In combination, a three-phase feeder circuit, a three-phase network circuit, a transformer having windings connected to the feeder circuit and windings connected to the network circuit, means responsive to the direction of energy exchange between said circuits for interrupting the network circuit and means connected to be energized in accordance with the balance of the impedances to ground of the phase conductors of the feeder circuit for controlling the sensitivity of said directional responsive means.

2. In combination, a feeder circuit, a network circuit, a transformer having windings connected to said circuits, circuit interrupting means in said network circuit, means normally responsive only to a predetermined relatively large value of electric energy flow from the network circuit to the feeder circuit for effecting the opening of said circuit interrupting means and means connected to said feeder circuit operative in response to a ground thereon for causing said energy responsive means to effect the opening of said circuit interrupting means in response to a relatively small value of electric energy flow from said network circuit to said feeder circuit.

3. In combination, a feeder circuit, a network circuit, a transformer having windings connected to said circuits, circuit interrupting means in said network circuit, means normally responsive only to a predetermined relatively large value of electric energy flow from the network circuit to the feeder circuit for effecting the opening of said circuit interrupting means and means responsive to an unbalance of the impedances to ground of the phase conductors of the feeder circuit for causing said energy responsive means to effect the opening of said circuit interrupting means in response to a relatively small value of electric energy flow from said network to said transformer.

4. In combination, two three-phase circuits, a transformer having windings connected to said circuits, means responsive to the direction of energy exchange between said circuits for disconnecting one of said circuits, control means connected to ground and capacitatively coupled to the other of said circuits for controlling the sensitivity of said energy directional responsive means in accordance with the balance of the capacitances to ground of the phase conductors of said other circuit.

5. In combination, two three-phase circuits, a transformer having windings delta connected to one of said circuits and windings Y-connected to the other of said circuits, means responsive to the direction of energy exchange between said circuits for disconnecting said other circuit from its Y-connected windings, a control circuit connected to ground and capacitatively coupled to the phase conductors of said one circuit and means connected in said control circuit operative on the occurrence of a predetermined flow of current therein to increase the sensitivity of said energy directional responsive means.

6. In combination, a feeder circuit normally having substantially balanced impedances to ground of the phase conductors thereof, a network circuit, a transformer interconnecting said feeder circuit and said network circuit, fault responsive means for effecting the disconnection of said transformer from said network circuit, and means connected to said feeder circuit operative in response to a predetermined unbalance of the impedances to ground of the phase conductors of said feeder circuit for varying the sensitivity of said fault responsive means.

7. In combination, a polyphase feeder circuit, a polyphase network circuit, a transformer having windings connected to said circuits, fault responsive means for effecting the disconnection of the transformer from the network circuit and means operative solely in dependence on the zero phase sequence voltage of the feeder circuit for controlling the sensitivity of said fault responsive means.

HUDSON R. SEARING.